(12) United States Patent
Friel et al.

(10) Patent No.: US 8,270,307 B2
(45) Date of Patent: Sep. 18, 2012

(54) NETWORK-ADAPTIVE PREEMPTIVE REPAIR IN REAL-TIME VIDEO

(75) Inventors: Joseph T. Friel, Ardmore, PA (US); Dihong Tian, San Jose, CA (US); J. William Mauchly, Berwyn, PA (US); Maurice Buttimer, Media, PA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 12/205,486

(22) Filed: Sep. 5, 2008

(65) Prior Publication Data

US 2010/0061225 A1 Mar. 11, 2010

(51) Int. Cl.
*H04L 12/26* (2006.01)

(52) U.S. Cl. .......................... 370/242; 370/468

(58) Field of Classification Search ................ 370/216, 370/241, 242, 245, 248, 249, 252, 253, 208, 370/437, 468; 714/710, 712, 746–748, 750, 714/751; 375/221, 225; 709/234
See application file for complete search history.

(56) References Cited

U.S. PATENT DOCUMENTS

| | | | | |
|---|---|---|---|---|
| 5,848,239 | A * | 12/1998 | Ando ........................... | 709/203 |
| 6,289,054 | B1 * | 9/2001 | Rhee ....................... | 375/240.27 |
| 6,314,535 | B1 * | 11/2001 | Morris et al. ................. | 714/708 |
| 6,338,090 | B1 * | 1/2002 | Emmes et al. ................ | 709/234 |
| 7,257,664 | B2 * | 8/2007 | Zhang ........................... | 714/748 |
| 2004/0105463 | A1 * | 6/2004 | Cheung et al. ................ | 370/468 |
| 2005/0254584 | A1 | 11/2005 | Kim et al. | |
| 2006/0015799 | A1 * | 1/2006 | Sung et al. ..................... | 714/795 |
| 2006/0029037 | A1 * | 2/2006 | Chen et al. ..................... | 370/351 |
| 2006/0098738 | A1 | 5/2006 | Cosman et al. | |
| 2006/0126712 | A1 * | 6/2006 | Teil et al. ...................... | 375/225 |
| 2006/0280113 | A1 * | 12/2006 | Huo .............................. | 370/208 |
| 2007/0008323 | A1 | 1/2007 | Zhou | |
| 2008/0247463 | A1 | 10/2008 | Buttimer et al. | |

FOREIGN PATENT DOCUMENTS

| | | |
|---|---|---|
| EP | 0763944 | 3/1997 |
| EP | 2143269 | 10/2008 |
| FR | 2880745 | 7/2006 |
| WO | WO 2006/075070 | 7/2006 |
| WO | WO 2008/124409 | 10/2008 |

OTHER PUBLICATIONS

"Error-Resilient Video Transmission Using Long-Term Memory Motion-Compensated Prediction" by Thomas Wiegand et al. IEEE Journal on Selected Areas in Communications, vol. 18, No. 6, pp. 1050-1062, Jun. 2000.

"Error Resilient Video Coding by Dynamic Replacing of Reference Pictures" by Shigeru Fukunaga et al. IEEE Globecom, pp. 1503-1508, 1996.

"Video Streaming: Concepts, Algorithms, and Systems" by John G. Apostolopoulos et al. Hewlett-Packard Lab Tech Report HPL-2002-260, pp. 1-34, Sep. 2002.

(Continued)

*Primary Examiner* — Andrew Lai
(74) *Attorney, Agent, or Firm* — Patent Capital Group

(57) ABSTRACT

A network-adaptive error recovery method for real-time video transmission based on sending repair frames preemptively with a frequency that is based on observed run-length of good frames and round trip time.

10 Claims, 2 Drawing Sheets

OTHER PUBLICATIONS

"Rate-Distortion Optimization for JVT/H.26L Video Coding in Packet Loss Environment" by Thomas Stockhammer et al. Packet Video Workshop 2002, Pittsburgh, PA, Apr. 2002.

EPO Nov. 14, 2011 European Search Report from EP Application 08744890; 9 pages.

Kimata, H., et al., "A study of key frame reference picture selection method for error resilient multiple video objects distribution," Multimedia and EXPO 2000, ICME 2000, vol. 3, 30; Abstract Only; http://ieeexplore.ieee.org/xpl/freeabs_all.jsp?arnumber=871047.

PCT Dec. 7, 2009 International Preliminary Report on Patentability from International Application PCT/US08/59065; 9 pages.

PCT Jun. 9, 20009 International Search Report from International Application PCT/US08/59065; 1 page.

Serrao, John, "FOSE 2008: Mobile Telepresence in the Cisco NERV," Telepresence Options, Apr. 3, 2008; 4 pgs; http://www.telepresenceoptions.com/2008/04/fose_2008_mobile_telepresence/.

"Text of ISO/IEC 14496-10 FCD Advanced Video Coding," 61, MPEG Meeting; Jul. 22-26, 2002; Klagenfurt; (ISO/IEC JTC1/SC29/WG11—Coding of Moving Pictures and Audio); No. N4920, Aug. 22, 2002 (XP030012343, ISSN: 0000-0365); 137 pages.

* cited by examiner

NETWORK-ADAPTIVE PREEMPTIVE REPAIR IN REAL-TIME VIDEO

FIELD OF THE INVENTION

The present application relates generally to network-adaptive preemptive repair in real-time video.

BACKGROUND OF THE INVENTION

Digital video may be sent using frames of complete images, known as "I-frames", separated by frames containing much less data (for bandwidth conservation purposes) known as "predictive frames" or "P-frames", so called because such frames in effect extrapolate to a complete video frame using predictions based on the preceding I-frame.

A drawback of P-frames is that transmission errors in an I-frame (for example) can not only affect the decoding quality of the current frame but also can be propagated to ensuing P-frames, which are based on preceding frames. To alleviate this, the current rate of packet loss may be reported by the receiver to the sender, which can send I-frames at higher rates in response. Or, the identity of every lost packet (rather than a rate) can be reported, with the sender responding by immediately encoding and sending a repair frame that is referenced to a properly received older frame.

BRIEF DESCRIPTION OF THE DRAWINGS

The details of non-limiting embodiments, both as to its structure and operation, can best be understood in reference to the accompanying drawings, in which like reference numerals refer to like parts, and in which.

DESCRIPTION OF EXAMPLE EMBODIMENTS

Overview

As recognized herein, the effectiveness of the above repair schemes decreases as the system round trip time (RTT) increases. Furthermore, the above-described on-demand repair schemes are not as effective under high loss circumstances as they are under low loss circumstances.

Accordingly, an apparatus includes a machine-implemented video sender configured to receive first information representing an error rate and to receive second information representing a round trip time (RTT) between the sender and a receiver of video. Based on the first and second informations, the apparatus determines a frequency with which to transmit, without request from the receiver, video repair data.

The information representing an error rate may include at least one and preferably two run length of good frames (RLG). The information representing a RTT establishes a threshold against which the information representing an error rate is tested, and the frequency is changed in response to the RLGs violating the threshold. The threshold itself can also be changed in response to the RLGs violating the threshold.

In a specific example, if both RLGs violate the threshold, the frequency is increased and if only one RLG violates the threshold the frequency is not changed. Similarly, after a non-zero frequency is established and both RLGs satisfy the threshold, the frequency is decreased and if only one RLG satisfies the threshold the frequency is not changed.

In another aspect, a method includes providing network-adaptive error recovery for real-time video transmission based on sending repair frames preemptively with a frequency. The frequency is based on at least one run-length of good frames (RLG) and a round trip time (RTT).

In yet another aspect, a method includes establishing a threshold based on round trip time (RTT) associated with a sender of video and a receiver of the video. The method also includes comparing indicia of error rate in the video as received by the receiver to the threshold. Based on the comparing act, it is decided whether to change a frequency with which video repair information is preemptively sent from the sender to the receiver.

DESCRIPTION OF EXAMPLE EMBODIMENTS

Figure 1:
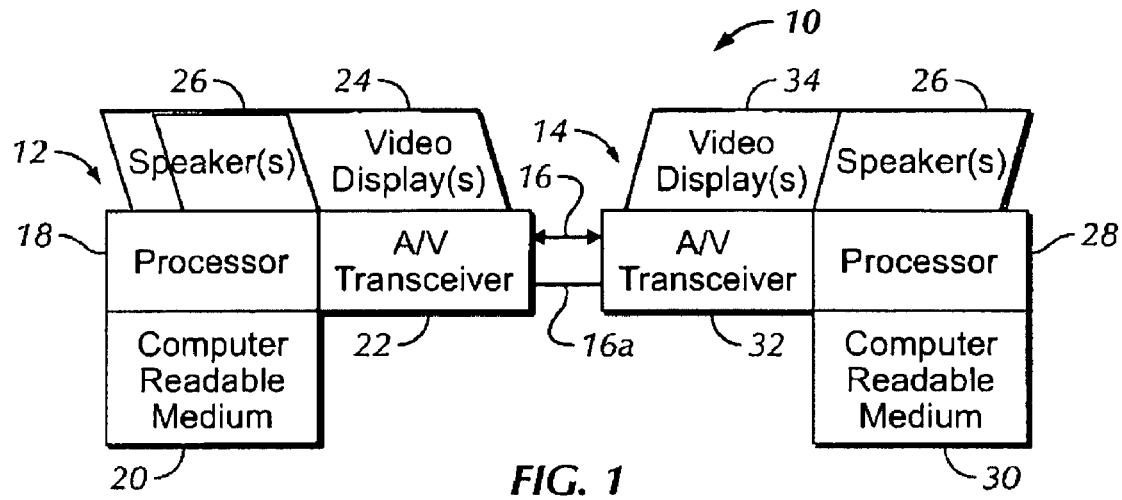
FIG. 1 is a block diagram of an example system.

Referring initially to FIG. 1, a system is shown, generally designated 10, which includes at least one video sender and at least one video receiver. In the non-limiting embodiment shown in FIG. 1, telepresence systems 12, 14, which can be regarded as video conferencing systems, both establish a video sender (for sending video to the other telepresence system) and a video receiver (for displaying video from the other telepresence system) using a wired and/or wireless communication path 16. FIG. 1 shows at 16a that a back channel can also be provided to convey current (real time) network information such as error rate and round trip time (RTT) information between the systems 12, 14. In some embodiments a single telepresence system may communicate with plural other such systems. It is to be understood that present principles apply generally to other types of senders and receivers of video information.

Taking the left-hand telepresence system 12 first, the system 12 may include one or more processors 18 accessing one or more tangible computer readable media 20 such as a hard disk drive or optical drive or solid state memory. Other appropriate computer readable media may be used, including magnetic tape, etc. The processor 18 may control a video (including audio/video) transceiver 22 to send video (and audio if desired) onto the path 16. The transceiver 22 may be thought of as including an encoder for encoding video to be sent and a decoder for decoding received video. Video from the right-hand system 14 in FIG. 1 may be presented on one or more video monitors 24 in the left-hand system 12, while audio may be displayed on speakers 26. The video monitor may be, without limitation, a high definition flat panel display.

Similarly, the right-hand telepresence system 14 may include one or more processors 28 accessing one or more tangible computer readable media 30 such as a hard disk drive or optical drive or solid state memory. Other appropriate computer readable media may be used, including magnetic tape, etc. The processor 28 may control a video (including audio/video) transceiver 32 to send video (and audio if desired) onto the path 16. Video from the left-hand system 12 in FIG. 1 may be presented on one or more video monitors 34 in the right-hand system 14, while audio may be displayed on speakers 36. The video monitor may be, without limitation, a high definition flat panel display.

Figure 2:
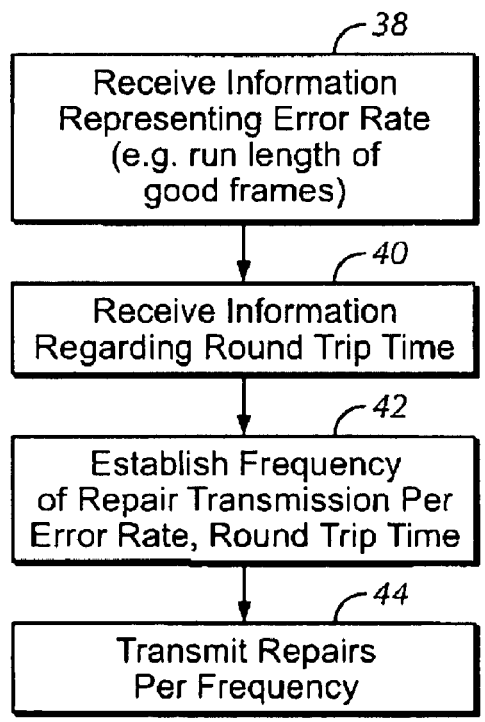
FIG. 2 is a flow chart of example overall logic.

FIG. 2 shows overall example logic. Commencing at block 38, information that essentially represents a current network error rate over the path 16 is received (over, e.g., the back-channel 16a) by a sender of video, e.g., the system 12 from a receiver of video, e.g., the system 14. In one implementation this information includes at least one and preferably the most recent two counts of, respectively, the two most recent groups of continuously received "good" frames. Thus, as an example, if the ten most recent frames received were "good", before which a frame error occurred, and the five frames before the error were all good following an earlier error, the two counts of good frames sent over the backchannel from the receiver to the transmitter would be ten and five. Alternatively, other error rate metrics such as percentage of lost packets may be used.

Continuing to block 40, information is sent from the receiver to the sender indicating the current network packet round trip time (RTT). Then at block 42 a frequency with which repair information is sent is established based on the RTT and the error rate information. The frequency can be measured in time, e.g., "send repair information every ten milliseconds", or it can be measured by number of frames, e.g., "send repair information every one hundred frames". In any case, it may now be appreciated that the frequency is adaptive to observed packet loss and round trip time. Repair information can then be sent preemptively (i.e., without a request for retransmission by the receiver) at block 42 by the sender to the receiver at the frequency established at block 40. In addition, repair information may also be sent on request for retransmission by the receiver.

In one implementation, the repair information sent includes long term reference picture (LTRP)-based repair frames in which frames other than I-frames are sent (e.g., P-frames) that are not necessarily referenced according to convention to a prior I-frame or P-frame of standard convention but rather to a prior frame that was known to be received without errors. It is to be understood, however, that other repair information may be sent. For example, other data units such as repair slices or macroblock rows may be sent.

In one embodiment of the invention, the repair method can be modeled as a state machine, with each state referring to a frequency at which repair frames are sent periodically. The initial state can be one in which repair frames are sent only upon request (a.k.a. on-demand), which can be regarded as the case of having a preemptive frequency equal to zero. Subsequent state transitions can then be determined based on the period(s) of successfully received (decoded) frames and the round trip time, both of which can be obtained from acknowledgement/negative acknowledgement (ACK/NAK) messages received on, e.g., the back channel 16a.

In particular, if the period(s) of successfully received frames are less than a threshold that is keyed to the round trip time, the encoder enters a state in which preemptive repair frames are sent at a higher frequency. This state transition may continue until the preemptive frequency has reached a predetermined maximum. In contrast, if the periods of successfully received frames become larger than a threshold determined based on the round trip time, the encoder transfers to a state with a lower preemptive frequency, and the transition stops when the encoder returns to the on-demand state.

Figure 3:
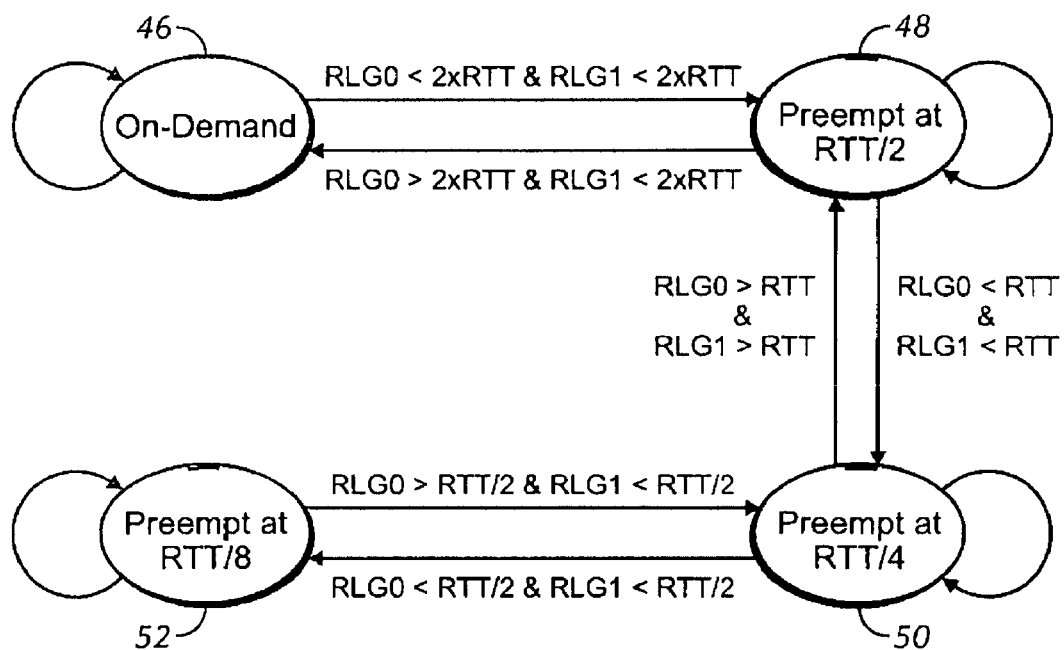
FIG. 3 is a diagram showing example non-limiting specific logic that may be used in accordance with present principles.

To illustrate, attention is now directed to FIG. 3, in which state transition of the encoder is based on the last two counts of consecutively received frames. Assume the two counts can be given by $RLG_x$, where x=0 or 1 and where RLG stands for "run length of good frames." While the two most recent counts can be used, only one count need be used or more than two counts can be used. Two counts are preferred for algorithmic stability.

In FIG. 3, when both RLGx are less than a threshold, which may be initialized at state 46 to, e.g., twice the round trip time (RTT), the encoder transfers from on-demand at state 46 to preemptive repair at state 48 as indicated by the arrow pointing from state 46 to state 48. In the non-limiting example shown, the frequency of preemptively transmitting repair frames under this circumstance might be established to be RTT/2. The RTT-based threshold against which subsequent RLGs are measured can then be reduced, e.g., by one-half.

The testing of the two most recent RLGs against the threshold can continue to dynamically change the frequency at which repair frames are preemptively sent from the sender to the receiver. For example, assume for purposes of disclosure that both of the most recently reported RLGs are again less than the (current) RTT-based threshold as indicated by the arrow pointing from state 48 to state 50. Under this circumstance, the encoder moves from state 48 to state 50, in which the preemptive sending interval is again decreased, in the non-limiting example shown by halving the interval (or equivalently by doubling the frequency).

The RTT-based threshold can again be reduced and if subsequent tests of the two most recent RLGs still indicate that both are less than the RTT-based threshold, the frequency of preemptively sending repair information is again increased, this time at state 52 (by, e.g., doubling it from its previous value) as shown by the arrow pointing from state 50 to state 52.

If only one of the two most recent RLGs violates the RTT-based threshold, the encoder remains in the state it is in. Preemptive repair frame transmission frequency may be reduced in accordance with principles above until a low limit is reached, e.g., one-eighth of the round trip time.

As also shown in FIG. 3, when both RLGs become larger than the current threshold, the preemptive interval increases (e.g., doubles) and concomitantly the RTT-based threshold is also increased (e.g., doubled). These frequency-decreasing transitions, which are represented by the arrows pointing from state 52 to 50, from state 50 to state 48, and from state 48 to state 46, stop when the state reverts to on-demand (state 46).

By jointly considering the run-length(s) of successfully received frames and the round trip time, varying network conditions can be quickly adapted to. When the network is in a good state with only occasional, independent packet losses, the on-demand mode for repair packet transmission will be effective, whereas when the network starts experiencing relatively frequent losses, error propagation is promptly corrected to provide smoother video using the preemptive (without request) transmission of repair information at a dynamically established frequency that is keyed to RTT.

The above-described preemptive RTT-based thresholds and associated repair frequencies may be established to optimize the trade-off between smoothness and overall quality.

While the particular NETWORK-ADAPTIVE PREEMPTIVE REPAIR IN REAL-TIME VIDEO is herein shown and described in detail, it is to be understood that the subject matter which is encompassed by the present invention is limited only by the claims.

What is claimed is:

1. An apparatus comprising:
   a machine-implemented video sender configured to:
   receive first information representing an error rate;
   receive second information representing a round trip time (RTT) between the video sender and a receiver of video; and
   based on the first and second information, determining a frequency with which to transmit video repair data, wherein the video repair data includes reference picture-based frames reflecting at least one prior frame known to be received without errors, wherein the information representing the error rate includes at least two run lengths of good frames (RLGs) and the information representing the RTT establishes a threshold against which the RLGs are tested, wherein if both RLGs violate the threshold, the frequency is increased and if one RLG violates the threshold the frequency is not changed.

2. The apparatus of claim 1, wherein the frequency is changed in response to the information representing an error rate violating the threshold.

3. The apparatus of claim 1, wherein the video sender responds to requests from the receiver to send video repair data.

4. The apparatus of claim 1, wherein after a non-zero frequency is established and both RLGs satisfy the threshold, the frequency is decreased and if one RLG satisfies the threshold the frequency is not changed.

5. A method comprising:
providing network-adaptive error recovery for real-time video transmission based on:
sending, by a frame transmitter, video repair frames preemptively with a frequency, the frequency being based on at least one run-length of good frames (RLG) and a round trip time (RTT), wherein video repair frames include reference picture-based frames reflecting at least one prior frame known to be received without errors, and wherein the RTT establishes a threshold against which the RLG is tested and the threshold is changed in response to the RLG violating the threshold; and
testing at least two RLGs against the threshold, wherein if both RLGs violate the threshold, the frequency is increased and if one RLG violates the threshold the frequency is not changed.

6. The method of claim 5, wherein the frequency is changed in response to the RLG violating the threshold.

7. The method of claim 5, comprising responding to requests from a receiver for repair frames.

8. A method, comprising:
establishing a threshold based on round trip time (RTT) associated with a sender of video and a receiver of the video;
comparing indicia of error rate in the video as received by the receiver to the threshold; and
based on the comparing act, deciding whether to change a frequency with which video repair information is preemptively sent, by a transmitter, from the sender to the receiver, wherein the video repair information includes reference picture-based frames reflecting at least one prior frame known to be received without errors, and wherein the indicia include at least two run-lengths of good frames (RLGs) and if both the RLGs violate the threshold, the frequency is increased and if one RLG violates the threshold the frequency is not changed.

9. The method of claim 8, wherein after a non-zero frequency is established and both RLGs satisfy the threshold, the frequency is decreased and if one RLG satisfies the threshold the frequency is not changed.

10. The method of claim 8, comprising responding to requests from a receiver for repair frames.

* * * * *